UNITED STATES PATENT OFFICE 2,307,075

VINYL RESIN COMPOSITION

William M. Quattlebaum, Jr., and Donald M. Young, Charleston, W. Va., assignors to Carbide and Carbon Chemicals Corporation, a corporation of New York No Drawing. Application August 2, 1940, Serial No. 350,084

11 Claims. (Cl. 260—86)

This invention is directed to improvements in those vinyl resins which may be formed by the polymerization of vinyl halides or by the conjoint polymerization of vinyl halides with other unsaturated and polymerizable compounds, examples of such compounds being vinyl esters, $\alpha,\beta$-unsaturated acids or their esters, $\alpha,\beta$-unsaturated ketones or aldehydes, and unsaturated hydrocarbons, such as the butadienes or the styrenes. The invention is of particular merit when applied to the vinyl resins made by the conjoint polymerization of vinyl chloride with vinyl esters of the lower aliphatic acids, as for instance, vinyl acetate.

Resins of the type defined above are known and have been suggested for different purposes in the art. Among other characteristics, such resins are distinguished by the property of thermoplasticity. In many applications this property is advantageous in that the resins may be softened by heating, and in this softened condition they may be molded into a variety of objects, they may be used as an adhesive for joining or stiffening various materials, or they may be applied as a coating by calendering to paper and like materials. Unfortunately, these artificial resins do not possess unlimited stability towards heat at temperatures above their softening points. Because of this, the use of these resins where a high degree of resistance to heat is required is necessarily limited.

Decomposition of the resins at temperatures above their softening point is usually initiated by the development of color in the resins. This stage is shortly followed by charring of the resins and the evolutions of gaseous products of decomposition from the mass. Because of the acidic nature of the decomposition products, it was postulated early in the development of these resins that the addition of basic substances to the resins should inhibit their thermal decomposition. Such proved to be the case and a number of basic stabilizing agents have been suggested, among which may be mentioned lead stearate, calcium stearate, calcium hydroxide, basic lead carbonate and triethanolamine. The most effective of such compounds from every viewpoint proved to be the basic metal soaps of the fatty acids, and, of such compounds, lead and calcium stearates and oleates have come into very common use as stabilizing agents for these resins.

These compounds have proved effective in stabilizing these resins against the second type of decomposition at least until color development in the resins becomes pronounced. While these compounds also inhibit serious color development in the vinyl resins on heating, they do not prevent a slight discoloration of the resins upon even short exposure to heat.

In the copending application of W. M. Quattlebaum, Jr., Serial No. 245,375, now Patent No. 2,256,625, heat stabilizers for these vinyl resins composed of alkaline earth alcoholates are described. These compounds are superior to the calcium and lead salts of the fatty acids in effectiveness but they do not completely inhibit color development in the vinyl resins upon heating to the temperatures required for their fabrication. In addition, the alcoholates are water-soluble which tends to reduce the resistance to moisture of articles fabricated from the resins.

According to this invention, a new class of heat stabilizing compounds has been developed which, when incorporated in these resins, permits them to retain their pure white color, upon their fabrication into articles or coatings by the application of heat. The new heat stabilizing compounds also inhibit (to a marked degree) the actual decomposition of the resin upon prolonged heating. These compounds are metal derivatives of 1,3 dicarbonylic substances, such as the beta-diketones and the esters of the beta-ketoacids, with aliphatic or aromatic alcohols, notably esters of acetoacetic acid. These compounds apparently are not simple alcoholates or salts but they are believed to be complex co-ordination compounds. It is thought that a co-ordinate linkage is established between the metal salt of the enol form of the keto ester or diketone and the oxygen atoms of the remaining carbonyl groups, the metal atom thereby becoming part of the two six membered rings. For calcium ethylacetoacetate, the structural formula according to this hypothesis is as follows:

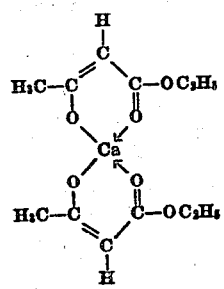

The properties of the metal derivatives of the acetoacetic esters differ so markedly from those of salts or alcoholates, that the "chelate" structure shown above has been assigned to them. Analogous compounds are obtained with beta-diketones.

Thus, unlike the alcoholates, these chelate derivatives are not readily hydrolyzed by water; they are soluble in organic solvents but insoluble in water; they possess low melting points, and in general exhibit the properties typical of organic compounds rather than those of metallic salts or alcoholates of organic compounds.

The alkaline earth derivatives of acetoacetic esters, which are particularly effective in preventing thermal discoloration of vinyl resins containing polymerized vinyl halides, possess other properties which make them more advantageous. Thus, they are insoluble in water and do not reduce the resistance of coatings of the resins to transmission of moisture. Also, in many cases they are compatible with the resins and do not affect their clarity.

Typical examples of heat stabilizing compounds of alkaline earth derivatives of acetoacetic esters are calcium ethylacetoacetate, calcium butylacetoacetates, calcium 2-ethylbutylacetoacetates, calcium 2-ethylhexylacetoacetates, calcium octylacetoacetates, calcium phenylacetoacetates, calcium benzylacetoacetates, and the corresponding compounds of barium, strontium and magnesium. These compounds may be made by heating the acetoacetic esters with the alkaline earth metals until evolution of hydrogen ceases and, if desired, in the presence of inert diluents, such as benzene, toluene or naphthalene. Ammoniacal solutions of salts of these metals will also react with acetoacetic esters to give the desired compounds.

The amounts of the alkaline earth derivatives to be incorporated with the vinyl resins for inhibiting their thermal discoloration is small and the most effective amounts are from 0.5% to 5% by weight of the resins. It has been found that the resistance of the resins to development of color on heating can be further increased by adding to the resin very small amounts, usually about 0.02% to 0.1% by weight, of alkyl or aryl tin oxides or salts of organic acids, such as dibutyl tin diacetate, dibutyl tin dilaurate, and dibutyl tin oxide along with the alkaline earth metal derivative of the acetoacetic ester. Traces of cadmium or lead salts, such as cadmium or lead stearates, also have a similar effect.

The following examples will illustrate the invention in detail:

Example 1

Samples of a resin formed by the conjoint polymerization of vinyl chloride with vinyl acetate were incorporated by milling with 1% by weight of three stabilizers, calcium stearate, calcium methylate, and calcium ethylacetoacetate, the latter a compound representative of this invention. After three hours heating of the samples in an oven at 135° C., the sample containing calcium stearate was brown, the sample containing calcium methylate was orange, and the sample containing calcium ethylacetoacetate was yellow, a color much less intense than that developed in the other samples in this stringent test.

It was noticed that the amount of water absorbed in a given test period by the resin containing 1% by weight of calcium ethylacetoacetate was about one-half as much as that absorbed by the sample containing 1% calcium methylate.

Example 2

A sample of the same resin as used in Example 1 was incorporated with 1% of calcium ethylacetoacetate and 0.05% of dibutyl tin diacetate. Upon heating this sample for three hours at 135° C., it remained much lighter in color throughout the heating period than was the case where the tin salt was omitted and it had only a yellow tint at the end of the heating period.

Example 3

Two paper coating compositions comprising a conjoint polymer of vinyl chloride with vinyl acetate were formulated containing in one case 1% by weight of calcium stearate and in the other 1% calcium ethylacetoacetate and 0.05% dibutyl tin diacetate. Both compositions were applied to paper by calendering at temperatures of about 110° C. to 120° C. The coating containing calcium stearate was yellow to tan in color but the coating containing the calcium ethylacetoacetate and the tin compound remained practically white.

The uses and modifications of the invention will be apparent and these are included within the scope of the invention as defined by the appended claims.

We claim:

1. A composition resistant to the discoloring effects of heat comprising an artificial thermoplastic resin, including a vinyl halide polymerized therein, intimately combined with a small amount of a basic metal chelate derivative of a 1,3-dicarbonylic compound capable of keto-enol tautomerism.

2. A composition resistant to the discoloring effects of heat comprising an artificial thermoplastic resin, including a vinyl halide polymerized therein, intimately combined with a small amount of a basic metal chelate derivative of an ester of a beta-ketoacid capable of keto-enol tautomerism.

3. A composition resistant to the discoloring effects of heat comprising an artificial thermoplastic resin, including vinyl chloride polymerized therein, intimately combined with a small amount of an alkaline earth metal chelate derivative of an acetoacetic ester.

4. A composition resistant to the discoloring effects of heat comprising an artificial thermoplastic resin, including vinyl chloride polymerized therein, intimately combined with a small amount of a calcium chelate derivative of an acetoacetic ester.

5. A composition resistant to the discoloring effects of heat comprising an artificial thermoplastic resin, including vinyl chloride polymerized therein, intimately combined with a small amount of an alkaline earth metal chelate derivative of an acetoacetic ester of an aliphatic alcohol.

6. A composition resistant to the discoloring effects of heat comprising an artificial thermoplastic resin, including vinyl chloride polymerized therein, intimately combined with a small amount of an alkaline earth metal chelate derivative of an acetoacetic ester and a lesser amount of one of the group consisting of alkyl and aryl tin salts of organic carboxylic acids.

7. A composition resistant to the discoloring effects of heat comprising a conjoint polymer of vinyl chloride with vinyl acetate intimately combined with a small amount of a calcium chelate derivative of an acetoacetic ester of an aliphatic alcohol.

8. A composition resistant to the discoloring effects of heat comprising a conjoint polymer of vinyl chloride with vinyl acetate intimately combined with a small amount of a calcium chelate derivative of an acetoacetic ester of an aliphatic alcohol and a lesser amount of one of the group consisting of alkyl and aryl tin salts of organic carboxylic acids.

9. A composition resistant to the discoloring effects of heat comprising a conjoint polymer of vinyl chloride with vinyl acetate intimately combined with a small amount of calcium ethylacetoacetate.

10. A composition resistant to the discoloring effects of heat comprising a conjoint polymer of vinyl chloride with vinyl acetate intimately combined with a small amount of calcium butylacetoacetate.

11. A composition resistant to the discoloring effects of heat comprising a conjoint polymer of vinyl chloride with vinyl acetate intimately combined with a small amount of calcium ethylacetoacetate and a lesser amount of dibutyl tin diacetate.

WILLIAM M. QUATTLEBAUM, JR.
DONALD M. YOUNG.